United States Patent [19]

Takada et al.

[11] 4,049,772
[45] Sept. 20, 1977

[54] PROCESS FOR THE RECOVERY OF CHROMIC ACID SOLUTION FROM WASTE WATER CONTAINING CHROMATE IONS

[75] Inventors: Shunsuke Takada, Yono; Kazunori Sato, Yokohama, both of Japan

[73] Assignee: Tokico, Ltd., Kawasaki, Japan

[21] Appl. No.: 755,193

[22] Filed: Dec. 29, 1976

Related U.S. Application Data

[63] Continuation of Ser. No. 524,881, Nov. 18, 1974, abandoned.

[51] Int. Cl.$^2$ ............................................. C01G 37/14
[52] U.S. Cl. ................................... 423/54; 210/37 B; 210/38 R; 210/30 R; 210/32
[58] Field of Search ............... 423/54; 210/37, 37 B, 210/38 R, 30 R, 32

[56] References Cited

U.S. PATENT DOCUMENTS

| | | | |
|---|---|---|---|
| 3,306,859 | 2/1967 | Sloan et al. | 210/37 B |
| 3,417,016 | 12/1968 | yagushita | 423/54 |
| 3,658,470 | 4/1972 | Zievers et al. | 210/37 B |
| 3,664,950 | 5/1972 | Saraceno et al. | 423/54 |
| 3,835,001 | 9/1974 | O'Brien | 423/54 |
| 3,856,916 | 12/1974 | Lefrancois et al. | 423/54 |
| 3,885,018 | 5/1975 | Smith | 423/54 |
| 3,903,237 | 9/1975 | Smith et al. | 423/54 |
| 3,989,624 | 11/1976 | Wachsmuth | 210/37 B |

*Primary Examiner*—Herbert T. Carter
*Attorney, Agent, or Firm*—Lane, Aitken, Dunner & Ziems

[57] ABSTRACT

A chromic acid solution can advantageously be recovered from the waste water by a process which comprises passing the waste water successively through an anion-exchange column system consisting of two or more serially interconnected anion-exchange resin columns each packed with an anion-exchange resin thereby deionizing the waste water, and, in the course of this deionization treatment, column backwashing the first anion-exchange resin when the anion-exchange capacity thereof has fallen to the point where the influent to and the effluent from the first anion-exchange resin column have become substantially equal in terms of chromate ion content. In the course of the regeneration treatment, the waste water is diverted to enter the anion-exchange column system through the second anion-exchange resin column. After the regeneration treatment has been completed, the first anion-exchange resin column is put back into service in the anion-exchange system so as to serve as the last stage. Thereafter the procedure described above is repeated with respect to the successive anion-exchange resin columns composing the system thereby permitting passage of the waste water to be carried out continuously. The eluate which results from the regeneration treatment is recovered as a reusable chromate solution.

4 Claims, 2 Drawing Figures

PROCESS FOR THE RECOVERY OF CHROMIC ACID SOLUTION FROM WASTE WATER CONTAINING CHROMATE IONS

This is a continuation of application Ser. No. 524,881, filed Nov. 18, 1974 and now abandoned.

FIELD OF THE INVENTION

This invention relates to a process for effective recovery of chromic acid solution from chromate ion-containing waste water discharged, for example, from chromium plating operations, chrome finishing operations and alumite bore-sealing operations.

BACKGROUND OF THE INVENTION

There has previously been suggested a method for purifying waste water containing chromate ions by passing the waste water through a cation-exchange resin and an anion-exchange resin in that order or, as occasion permits, through an anion-exchange resin alone. According to this method, as the ion-exchange capacity of an ion-exchange resin gradually decreases as the waste water is refined, the resin is subjected to a regeneration treatment to enable reuse. In this method, the regeneration of anion-exchange resin is effected by a conventional technique wherein the anion-exchange resin is subjected to a regeneration treatment while still retaining its ion-exchange capacity to some extent, i.e. immediately after or before the anions entrained in the waste water begin to leak through the anion-exchange resin. When the anion-exchange resin is regenerated as just described, however, the anion-exchange resin still retains adsorbed thereon not only chromate ions originating in the waste water but also other contaminant anions and, therefore, the effluent (eluate) flowing out of the anion-exchange resin inevitably entrains the defiling anions in addition to the chromate ions. If this eluate is recycled to the chromium plating operation, chrome finishing operation, alumite bore-sealing operation, etc., therefore, the contaminants will cause various adverse effects. Thus, the eluate in its unaltered form is not suitable for use as a recycled chromic acid solution. If the chromate ion-containing washing discharged from the chromium plating operation is refined by using an ion-exchange resin and the exhausted anion-exchange resin is regenerated as described above, for example, then the resultant eluate which flows out of the anion-exchange resin entrains therein other contaminating anions in addition to the chromate ions. If the eluate is recycled to the chromium plating operation, the defiling contaminants accumulate in the plating bath and consequently induce defective plating. In one experiment, a bright hard chrome plating treatment was conducted in a Sargent bath containing 250 g/lit. of $CrO_3$ 2.5 g/lit. of $H_2SO_4$ with a 50 A/dm$^2$ current density and at a 50° C bath temperature. It was found that adverse effects such as, for example, absence of brightness in the formed plate and degradation of plate hardness appeared when 100 – 200 ppm of nitrate ions were present as contaminants in the bath and that similar phenomena were recognized when 300 to 400 ppm of chlorine ions found their way into the bath.

On the other hand, if the waste water containing chromate ions is released in its untreated form into surface water, it will cause "environmental pollution." Under these circumstances, need has been felt for provision of a method which is capable of refining the waste water containing chromate ions and at the same time capable of recovering from the waste water a chromic acid solution which entrains no contaminating anions and which can be recycled to the chromium plating operation, etc.

SUMMARY OF THE INVENTION

It is, therefore, an object of this invention to provide, in connection with an operation for purifying a waste water containing chromate ions by use of ion-exchange resins, a process for the recovery of a chromic acid solution from the chromate ion-containing waste water, which comprises selectively adsorbing chromate ions on an anion-exchange resin and subjecting this anion-exchange resin to a regeneration treatment whereby an eluate backwash from the anion-exchange resin may be recovered in the form of a chromic acid solution containing almost exclusively chromate anions.

Other objects of this invention will become apparent from the following description of the invention. Research directed to securing the above objective has led to the discovery that not only does the adsorbability of ions on an ion-exchange resin increases with increasing concentration of ions present but that the adsorbing strength with which the resin presents at a given ion concentration generally varies with the particular type of ions present. Test directed to the comparative strength of attraction to the ion exchange resin exhibited by chromate ions and other various anions possibly contained in the waste water when present at concentrations of the same order, have found that the adsorbing strength is stronger for chromate ions than for the various other anions. Accordingly it is believed that chromate ions are adsorbed substantially exclusively on the anion-exchange resin and that the other anions are no longer adsorbed thereon at the point of time where the chromate ion content of the influent to the anion-exchange resin and that of the effluent from the anion-exchange resin are practically equal.

The present process comprises passing the waste water successively through an anion-exchange system consisting of two or more serially interconnected anion-exchange resin columns to deionize the waste water, and in the course of the deionization subjecting the first anion-exchange resin column constituting the first part of the flow path of the waste water to a regeneration treatment after its anion-exchange capacity has fallen to a point where the influent to and this effluent from the first anion-exchange resin column have become substantially equal in terms of chromate ion content. During the course of the regeneration treatment, the waste water is diverted to enter through the anion-exchange system through the second anion-exchange resin column. After the regeneration treatment has been completed, the first anion-exchange resin column is put back into service in the anion-exchange system so as to serve as the last stage in the path of the flow of the waste water through the system. Thereafter the procedure described above is repeated with respect to the successive anion-exchange resin columns composing the system thereby permitting purification of the waste water to be carried out continuously. Thus, the waste water can be continuously purified and at the same time the eluate obtained as a consequence of the regeneration treatment can be recovered in the form of a chromic acid solution containing almost exclusively chromate ions.

BRIEF EXPLANATION OF THE DRAWINGS

The accompanying drawings are flow diagrams schematically illustrating a system for purification of a waste water containing chromate ions by means of ion-exchange and simultaneously recovering a chromic acid solution from the waste water in accordance with the present invention.

DETAILED DESCRIPTION OF THE INVENTION

Figure 1:
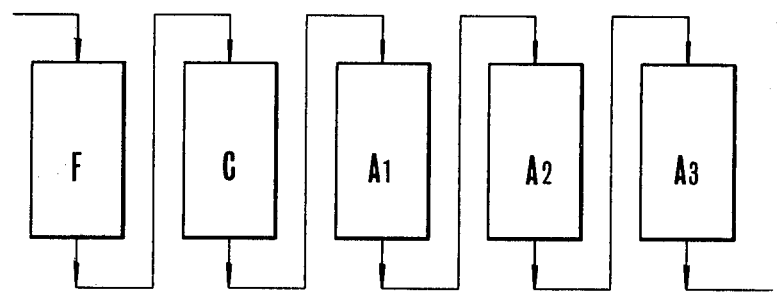
FIG. 1 illustrates the state of the system at the start of a cycle.

The cation-exchange resins which are suitable for use in the present invention include, for example, H form, strongly acidic cation-exchange resins such as DOWEX 50W×8 (made by The Dow Chemical Company), LEWATIT SP120 (made by Bayer AG), AMBERLITE 200C (made by Rohm and Haas Company), DIAION SK1B (made by Mitsubishi Chemical Industry Co., Ltd.) and IMAC C16P (made by Imachi) and H form, weakly acidic cation-exchange resins such as DOWEX CCR-2 (made by The Dow Chemical Company), LEWATIT CNP (made by Bayer AG), AMBERLITE IRC-50 (made by Rohm and Haas Company) and Diaion WK10 (made by Mitsubishi Chemical Co., Ltd.). The anion-exchange resins which are suitable for use in this invention include, for example, OH form, medially basic anion-exchange resins such as LEWATIT MP64 (made by Bayer AG) and AMBERLITE IRA-68 (made by Rohm and Haas Company); OH form, weak basic anion-exchange resins such as AMBERLITE IRA-93 (made by Rohm and Haas Company), AMBERLITE IRA-45 (made by Rohm and Haas Company) and DIA-ION WA-10 (Mitsubishi Chemical Co., Ltd.); and OH form, strongly basic anion-exchange resins such as DOWEX 21K (made by The Dow Chemical Company), LEWATIT MP600 (made by Bayer AG), and DIA-ION PA-306 (Mitsubishi Chemical Co., Ltd.). Further, in the present invention, salt form, strongly basic anion-exchange resins such as Cl form strongly basic anion-exchange resins like AMBERLITE IRA-900 (made by Rohm and Haas Company), AMBERLITE IRA-400 (made by Rohm and Haas Company), DOWEX 1X (made by The Dow Chemical Company) and DOWEX MSA-1 (made by The Dow Chemical Company) and salt form resins prepared by converting the OH form, strongly basic anion-exchange resins into salt form; salt form, medially basic anion-exchange resins such as are prepared by converting the OH form, medially basic anion-exchange resins into salt form; and salt form, weakly basic anion-exchange resins such as are obtained by converting the OH form, weakly basic anion-exchange resins into the salt form may be used as anion-exchange resins.

In the present invention, the waste water containing chromate ions is generally first passed through the aforementioned cation-exchange resin column. In this case, the cation exchange may be effected by using only one cation-exchange resin column or using two or more cation-exchange resin columns. The cations contained in the waste water are thus removed. Subsequently, the waste water is passed successively through an anion-exchange column system consisting of two or more serially interconnected anion-exchange resin columns each packed with one or more of the aforementioned anion-exchange resins. The desired purification of the waste water is consequently attained. In this operation, after the anion-exchange capacity of the first anion-exchange resin column, forming the first part of the flow path for the waste water through the system, has fallen to an extent that the influent to the first anion-exchange resin column and the effluent from the first anion-exchange resin column have become substantially equal in terms of chromate ion content, the waste water is passed successively through the anion-exchange system at the second anion-exchange resin column. At the time that the first anion-exchange resin column in the flow path is placed in service, other contaminating anions as well as chromate ions present in the waste water are adsorbed on its resin. As the ion-exchange capacity of the first column gradually declines, increasingly amounts of the chromate ions are adsorbed on the resin by displacing the other anions formerly adsorbed on the resin because of the greater attraction of the chromate to the resin, with the result that the ratio absorbed of chromate ions continues to increase proportionally. Finally, substantially all absorbed anions are chromate. At the point the influent to the column and the effluent from the column are substantially equal in terms of chromate ion content, and the column has completely lost its ion-exchange capacity and reached the point of saturation. At this point, a chromic acid solution containing almost exclusively chromate ions can be obtained in the form of an eluate by washing the first anion-exchange resin column. The elution may be accomplished with an aqueous alkali solution. Regeneration is accomplished, for example, by passing through the column an aqueous alkali solution such as an aqueous 5 - 10% NaOH solution or an aqueous 5 - 10% KOH solution in a volume two to three times as large as that of the resin in the column. In the regeneration of the first anion-exchange resin column according to the present invention, if it is desired that the eluate consequently produced contain anions other than chromate ions in small proportions, it will suffice to pass through the column a volume of water more than ten times as large as that of the resin in the column prior to passing the aqueous alkali solution through the column. Generally, the exchange capacity of an anion-exchange resin depends on the quantity of exchange groups present in the resin. However, all the exchange groups of a resin are not necessarily exchangeable to 100%, since the exchange ratio depends upon the pH of the influent. To be more specific, the exchange ratio of the anion-exchange resin increases with decreasing value of influent pH and it decreases with increasing value of pH. The waste water containing chromate ions treated by the present invention has a pH value in the neighborhood of 7 at the time that it enters the cation-exchange resin column. Upon discharge from the cation-exchange resin column, after having been divested of entrained cations during passage through the cation-exchange resin column, it has pH value in the range of 3 to 4. In the anion-exchange resin column, therefore, the resin is saturated after having retained anions up to an exchange ratio corresponding to a pH of 3 - 4. When municipal water, industrial service water or similar water having a pH value of the order of 7 is passed through the resultant saturated anion-exchange resin, accordingly, the exchange ratio of the column is lowered to a level corresponding to pH 7. As a result, the column is supersaturated to the extent of leakage of anions. In this case, of the various anions adsorbed on the resin, those for which the resin has less adsorbing strength, leak from the resin at a higher rate than the other anions. Thus, the ratio of other anions (contaminants) to chromate ions in the effluent leaving the column becomes greater than the ratio of these anions to chromate ions within the column interior. Thus, an eluate containing defiling contaminant anions in an extremely small proportion can be obtained by subsequently subjecting the column to a regeneration treatment as described above. In this case, no advantageous regeneration for the purpose is attained unless the water passed through the saturated anion-exchange resin column is a volume more than ten times as large as that of the resin held in the anion-exchange resin column. In this case, municipal water, industrial service water or other similar water which has served the purpose of eluting adsorbed anions, now contains chromate ions to some degree. Therefore, this discharged water, either in conjunction with or independently of the chromate ion-containing waste water involved in the present invention, may be recycled for purification by the process and, at the same time permit recovery of additional chromate values. Further, where the eluate is obtained without any preliminary water wash, if the eluate is desired to contain anions other than chromate ions at a low concentration, it suffices to pass a suitable amount of a chromic acid solution of a concentration higher than 100 ppm through the anion-exchange resin column before the column is subjected to the regeneration treatment using an aqueous alkali solution. As a result of passing a chromic acid solution through the saturated anion-exchange resin which has been saturated, the chromate ion concentration within this column is increased. Since the adsorbability of a given ion on a resin generally increases with the increasing concentration of the ions, it follows that, of the various anions adsorbed within the column, those anions other than chromate ions displace the chromate ions present in the chromic acid solution and consequently flow out of the column. Thus, the other anions are almost completely removed from within the column. When the column is subsequently subjected to the regeneration treatment, there is obtained an eluate containing anions other than chromate in an extremely low concentration. When the chromic acid solution used for this purpose has too low a concentration, it fails to provide the desired effect. Although the effect increases with increasing concentration of the solution, there is a possibility that a solution having too high a concentration will speed degradation of the resin within the column. Thus, the concentration of the solution should exceed 100 ppm and preferably be in the range from 1000 to 5000 ppm. The amount of the chromic acid solution passed through the column may be on the order of from one to ten times the volume of the resin in the column. The chromic acid solution which consequently flows out of the column is recovered and can be recycled to the pretreatment which precedes the regeneration treatment given the saturated anion-exchange resin column.

The first anion-exchange resin column which has undergone the regeneration treatment is then put back to service as the last stage in the flow path of the waste water through the system. Thereafter, when the regeneration procedure is successively performed on the subsequent anion-exchange resin columns composing the system, the waste water can be continuously purified and at the same time an eluate which comprises a chromic acid solution almost solely containing chromate ions can be obtained. $Na^+$, $K^+$ and similar cations originating in the aqueous alkali solutions used in the regeneration treatment of anion-exchange resin find their way into the eluate which is obtained. If the cations do not bring about any adverse effects when the eluate is recycled to the chromium plating operation, chrome finishing operation, or alumite bore-sealing operation, then the eluate can be used in its unaltered form. Where necessary, the eluate may be passed through a cation-exchange resin of the aforementioned type so as to remove the cations, and then reused. In the meantime, the purified water may be discarded without further treatment or may be used in the washing line in the chromium plating operation. Since this water contains contaminating anions other than chromate which have leaked through the anion-exchange column, it may be further purified, as occasion demands, by passage through the anion-exchange resin so as to be converted into pure water containing substantially no anions. For the purpose of this find purification step, there may be used a single anion-exchange resin column or, where necessary, two or more anion-exchange resin columns. The purified water consequently obtained may be recycled as service water for the plating operation, for example.

Now, the present invention will be described by reference to the accompanying drawing.

Figure 2:
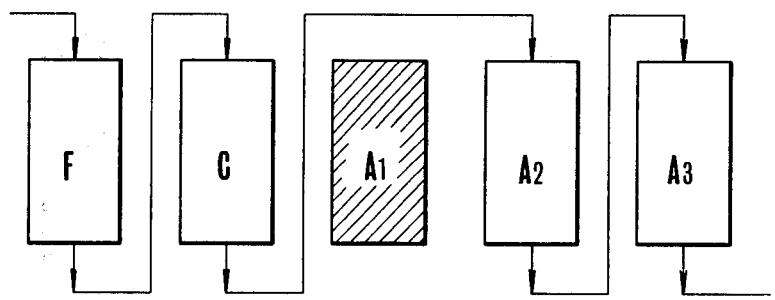
FIG. 2 illustrates the state of the system when the first anion-exchange resin column of FIG. 1 is disconnected and subjected to a regeneration treatment.

In FIG. 1 and FIG. 2, F denotes a filtration column, C denotes a cation-exchange resin column and $A_1$, $A_2$ and $A_3$ each denote an anion-exchange resin column. These anion-exchange resin columns are serially arranged in three stages. In FIG. 2, the block $A_1$ represents an anion-exchange resin column which is undergoing the regeneration treatment. According to the present invention, the waste water is passed, as shown in FIG. 1, first through F and C and subsequently through $A_1$, $A_2$ and $A_3$ and the treated water which issues from $A_3$ is taken as refined water. As this operation is continued, $A_1$ is eventually saturated with anions. Consequently, defiling anions other than chromate ions begin to leak through $A_1$. As the operation is further continued, the chromate ions present in the waste water which flows into $A_1$ displaces the other anions already adsorbed in $A_1$ and are grasped and adsorbed by $A_1$. In the course of the passage of the waster water, therefore, the adsorption of chromate ions in $A_1$ gradually reaches a point at which all the chromate ions present in the waste water which flows into $A_1$ can no longer be retained within $A_1$, with the result that a part of the chromate ions begin to leak from $A_1$. Thereafter, the proportion of chromate ions which pass through $A_1$ increases by degree until the chromate ion content of the influent to $A_1$ and that of the effluent from $A_1$ become substantially equal. After the point of time where the influent of waste water to $A_1$ and the effluent of waste water from $A_1$ have become substantially equal in terms of chromate ion content, $A_1$ is disconnected from the exchange system and the waste water is rerouted as illustrated in FIG. 2, so that the waste water is now passed sequentially through F and C to $A_2$ and $A_3$. The treated water which issues from $A_3$ is removed as purified water. In the meantime, $A_1$ which has become saturated with chromate ions is subjected to a regeneration treatment by passing through $A_1$ an aqueous 5 – 10% NaOH solution or aqueous 5 – 10% KOH solution of a volume two to three times as large as that of the resin in column $A_1$ to elute the resin. The resultant eluate is recovered in the form of a chromic acid solution which contains almost exclusively chromate ions. After the regeneration treatment, $A_1$ is put back into the exchange column system for the waste water. In this case, the waste water is passed through F and C first and then through $A_2$, $A_3$ and $A_1$, with the purified water being discharged from $A_1$. The aforementioned procedure is successively repeated for eluting columns $A_2$ and $A_3$.

According to the present invention, a waste water containing chromate ions can advantageously be purified in a continuous manner and at the same time a chromic acid solution can effectively be recovered from the waste water as described above. Accordingly, the present invention is believed to make a contribution to the solution of a pollution problem and also provides means for the more full utilization of chromium resources.

Now the present invention will be described more specifically by reference to preferred embodiments. It should be understood, however, that the present invention is not limited to these Examples.

EXAMPLE 1

Lewatit SP120 (made by Bayer AG) was employed in one column as a cation-exchange resin. An anion-exchange resin, Lewatit MP64 (made by Bayer AG) was used. In three anion-exchange resin columns serially interconnected as three stages. In accordance with the procedure described above with reference to the accompanying drawing, a waste water containing chromate ions was subjected to a purifying treatment as described below and a chromic acid solution was recovered from the waste water.

The waste water containing chromate ions was filtered through F. Thereafter, it was passed through C and then through $A_1$, $A_2$ and $A_3$, with the flow velocity fixed at $SV = 30$ (SV: indicating a relative volume of waste water passed per hour through the unit volume of resin in lit./lit.-R/hour) and $LV = 3$ (LV: indicating the rate of speed of the flow of waste water through the resin column in meters/hour), with the treated water discharged from $A_3$ being purified water. When, in the course of the deionization, the influent of waste water into $A_1$ and the effluent of waste water from $A_1$ became substantially equal in terms of chromate ion content, $A_1$ was disconnected from the flow path. Then, an aqueous 5% NaOH solution of a volume twice as large as that of the resin in the column was passed through $A_1$ to wash the resin and effect regeneration thereof. The resultant eluate was recovered and analyzed to determine the concentrations of various anions present. The waste water entering the purification system was also analyzed to determine the concentrations of the various anions contained therein. The results of the analyses were as shown in Table 1 below.

Table 1

| Anion (as acid) | Specimen | |
|---|---|---|
| | Waste water (ppm) | Eluate (ppm) |
| $H_2CrO_4$ | 500 | 60000 |
| $H_2SO_4$ | 100 | 105 |
| HCl | 100 | 4 |
| $H_3PO_4$ | 100 | 170 |
| $HNO_3$ | 100 | 90 |
| $CH_3COOH$ | 100 | <1 |

It is seen from Table 1 that, while the ratio of chromate ions to the total remaining anions was 1 : 1 in the waste water, the ratio became 1000 : 6 in the eluate.

EXAMPLE 2

A waste water containing chromate ions was treated in exactly the same way as in Example 1. When the flowing into $A_1$ and the effluent of waste water leaving $A_1$ became substantially equal in terms of chromate ion content, $A_1$ was disconnected from the flow system. An aqueous 5% NaOH solution of a volume twice as large as that of the resin present in $A_1$ was passed through $A_1$ to regenerate the resin therein. The resultant eluate was recovered. The analyses of the various anions contained in the eluate and those of the various anions contained in the waste water prior to the purification treatment were as shown in Table 2 below.

Table 2

| Anion (as acid) | Specimen | |
|---|---|---|
| | Waste water (ppm) | Eluate (ppm) |
| $H_2CrO_4$ | 50 | 55000 |
| $H_2SO_4$ | 4.7 | 470 |
| HCl | 28 | 5 |
| $H_3PO_4$ | 6.3 | 98 |
| $HNO_3$ | 3.6 | 51 |
| $CH_3COOH$ | <1 | <1 |

It is clear from Table 2 that even with a waste water containing anions at lower concentrations, a similar purifying effect to that of Example 1 was obtained.

EXAMPLE 3

A waste water containing chromate ions was treated in the same manner as in Example 1. When the influent waste water to $A_1$ and the effluent of from $A_1$ became substantially equal in terms of chromate ion content, $A_1$ was disconnected from the flow system. $A_1$ was washed first with municipal water in a volume ten times as large as that of the resin. Thereafter, an aqueous 5% NaOH solution of a volume twice as large as that of the resin in $A_1$ was used to elute and regenerate the resin column. The resultant eluate was recovered. The analyses of the various anions contained in the eluate and those of the various anions contained in the waste water prior to the purification treatment were as shown in Table 3 below.

Table 3

| Anion (as acid) | Specimen | |
|---|---|---|
| | Waste water (ppm) | Eluate (ppm) |
| $H_2CrO_4$ | 500 | 59000 |
| $H_2SO_4$ | 100 | 45 |
| HCl | 100 | <1 |
| $H_3PO_4$ | 100 | 73 |
| $HNO_3$ | 100 | 19 |
| $CH_3COOH$ | 100 | <1 |

EXAMPLE 4

A waste water containing chromate ions was treated in the same manner as in Example 1. At the time that the influent waste water to $A_1$ and the effluent of waste water from $A_1$ became substantially equal in terms of chromate ion content, $A_1$ was disconnected from the system of flow. $A_1$ was first washed with a chromic acid solution (chromic acid concentration: 1000 ppm) of a volume twice as large as that of the resin in $A_1$. Then, an aqueous 5% NaOH solution of a volume twice as large as that of the resin in $A_1$ was used to elute and regenerate the resin column. The resultant eluate was recovered. The analyses of the various anions contained in the eluate and those of the various anions present in the waste water prior to purification were as shown in Table 4 below.

Table 4

| Anion (as acid) | Specimen | |
|---|---|---|
| | Waste water (ppm) | Eluate (ppm) |
| $H_2CrO_4$ | 500 | 68000 |
| $H_2SO_4$ | 100 | 15 |
| HCl | 100 | <1 |
| $H_3PO_4$ | 100 | 11 |
| $HNO_3$ | 100 | 4 |
| $CH_3COOH$ | 100 | <1 |

EXAMPLE 5

A waste water containing 50 ppm of chromate ions (as $H_2CrO_4$) and 20 ppm of sulfate ions (as $H_2SO_4$) was treated in exactly the same way as in Example 1. After chromate ions began to show in the effluent from $A_1$, $A_1$ was disconnected from the system flow at varying concentrations of chromate in the effluent. An aqueous 5% NaOH solution of a volume twice as large as that of the resin in $A_1$ and then passed through $A_1$ to wash and regenerate the resin column. The resultant eluates were each recovered. The eluates were analyzed for sulfate ion content to determine the relationship between the time for $A_1$ regeneration and the amount of sulfate ions contained. The results are shown in Table 5 below.

Table 5

| Time for regeneration (leak concentration of chromate ions) | Eluate | |
|---|---|---|
| | Chromate ions (as $H_2CrO_4$) | Sulfate ions (as $H_2SO_4$) |
| 1 ppm | 28000 ppm | 7110 ppm |
| 10 | 35500 | 5110 |
| 20 | 39000 | 3440 |
| 30 | 43000 | 1860 |
| 40 | 43500 | 1610 |
| 50 | 44000 | 1340 |

It is clear from Table 5 that the sulfate ion content was smallest in the eluate which was obtained when $A_1$ was disconnected from the system and regenerated when the influent waste water to $A_1$ and the effluent waste water from $A_1$ had become substantially equal in terms of chromate ion content (leak concentration of chromate ion: 50 ppm).

We claim:

1. A continuous process for the removal and recovery of chromate anions from a waste water containing chromate anions, other anion impurities and cation impurities, and said process comprising:
    passing the waste water through a cation-exchange resin to remove the cation impurities; then
    passing the waste water in a flow path through an anion-exchange system comprising at least first and second columns connected together in series, each of said columns being packed with an OH form basic anion-exchange resin;
    removing said first column from said flow path when or after the chromate content of the influent to said first column and the effluent from said first column have become substantially equal and diverting said waste water, at the time of the removal of said first column from said flow path, to enter said second column;
    eluting absorbed chromate ions from said first column by passing a chromic acid solution containing at least 100 ppm chromate anions through said first column and thereafter passing an aqueous alkali solution through said first column; and
    replacing said first column back into said system by connecting it to the effluent end of the last column in series.

2. The process of claim 1 wherein the removing and eluting steps are repeated with respect to each column at the influent portion of said system.

3. The process of claim 1 wherein said aqueous alkali solution is an aqueous sodium hydroxide solution or an aqueous potassium hydroxide solution.

4. The process of claim 1 wherein the concentration of said chromic acid solution is in the range of 1000–5000 ppm.

* * * * *

UNITED STATES PATENT AND TRADEMARK OFFICE
CERTIFICATE OF CORRECTION

PATENT NO. : 4,049,772
DATED : September 20, 1977
INVENTOR(S) : Shunsuke Takada et al It is certified that error appears in the above-identified patent and that said Letters Patent are hereby corrected as shown below:

In the Abstract:

Line 8, delete "column".
Line 9, after "resin" insert --column--.

In the Specification:

Column 1, lines 51 and 52, delete "the defiling" and insert --these other--.

Column 2, line 49, change "this" to --the--;
same line, delete "the" (second occurrence);
line 53, delete "through".

Column 3, line 29, change "Diaion" to --DIA-ION--;
line 35, change "weak" to --weakly--.

Column 4, line 11, delete "passed successively" and insert --diverted to enter--;
line 21, change "absorbed of" to --of absorbed--;
line 24, change "the" (first occurrence) to --this--.

Column 5, line 7, delete "defiling".
Column 6, line 21, change "find" to --final--.

Column 7, line 3, delete "column"; line 4, delete "for the waste water. In this case".

UNITED STATES PATENT AND TRADEMARK OFFICE
CERTIFICATE OF CORRECTION

PATENT NO. : 4,049,772
DATED : September 20, 1977
INVENTOR(S) : Shunsuke Takada et al It is certified that error appears in the above-identified patent and that said Letters Patent are hereby corrected as shown below:

Column 7, line 5, after "is" insert --then--.

Column 8, line 4, after "the" (second occurrence) insert --waste water--;
line 5, delete "of"; line 32, delete "of".

Column 9, line 21, change "and" (first occurrence) to --was--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks